United States Patent

[11] 3,597,971

| [72] | Inventor | Walter Erlenbach<br>Hoffman Estates, Ill. |
|---|---|---|
| [21] | Appl. No. | 855,817 |
| [22] | Filed | Sept. 8, 1969 |
| [45] | Patented | Aug. 10, 1971 |
| [73] | Assignee | Illinois Tool Works, Inc.<br>Chicago, Ill. |

[54] COMBINED LEVEL INDICATOR AND HYDROMETER
7 Claims, 6 Drawing Figs.

[52] U.S. Cl. ................................................ 73/291, 73/447
[51] Int. Cl. ....................................... G01n 9/18, G01f 23/02
[50] Field of Search ........................................ 73/447–451, 441, 32, 291, 327, 323; 136/182, 182.3, 182.4

[56] References Cited
UNITED STATES PATENTS

| 1,482,852 | 1/1924 | Kloepper | 73/291 |
| 1,583,859 | 5/1926 | Sears | 73/444 X |
| 1,648,412 | 11/1927 | Linebarger | 136/182. (5) |
| 2,469,560 | 5/1949 | Jutte | 73/291 |
| 3,362,224 | 1/1968 | Melone | 73/327 |
| 2,889,703 | 6/1959 | Lipson et al. | 73/451 X |
| 3,417,614 | 12/1968 | Ryder | 73/327 |

Primary Examiner—Louis R. Prince
Assistant Examiner—Daniel M. Yasich
Attorneys—Olson, Trexler, Wolters & Bushnell, Robert W. Beart, Michael Kovac, Barry L. Clark and Jack R. Halvorsen ABSTRACT: An optical liquid level indicator having a wedge-shaped transparent platelike light transmitting member for receiving and transmitting light to visually provide an observer a determination of liquid level in a container and hydrometer, in the form of an open access chamber containing one or more controlled density balls, so arranged relative to the indicator that it will simultaneously provide a direct readout through the indicator to the observer as to the condition of the specific gravity of the liquid at the same time as the checking of its level.

Patented Aug. 10, 1971  3,597,971
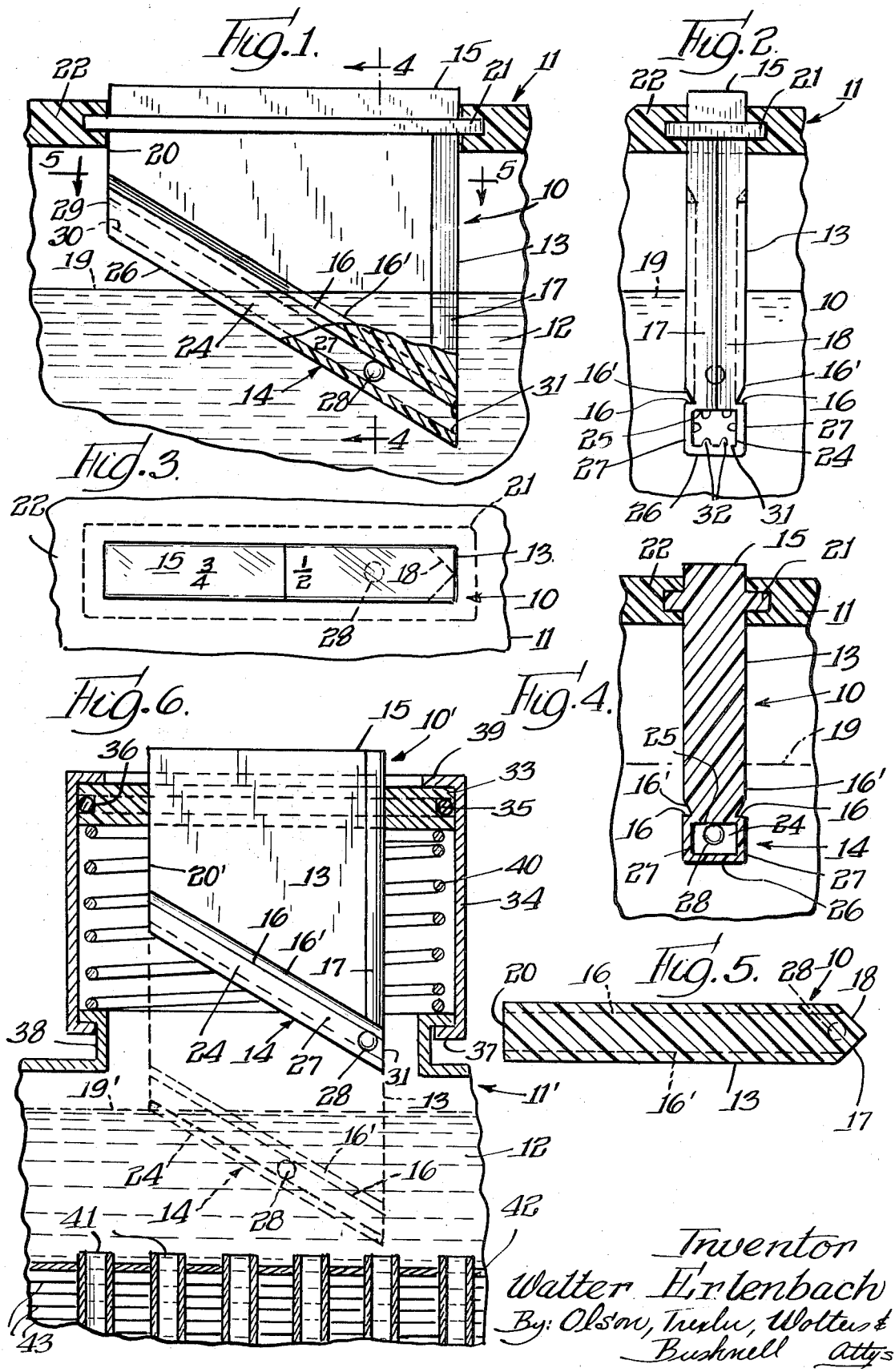

COMBINED LEVEL INDICATOR AND HYDROMETER

The present invention relates to a novel device for checking liquid levels and specific gravity, and more specifically to a novel combined liquid level indicator and hydrometer.

It is an important object of the present invention to provide a combined light-transmitting liquid level indicator and hydrometer means of extremely simple, yet very practical form adapted to be supported by and to depend from the upper wall of a liquid container and to be retained at a fixed position or raised and lowered from an inoperative position to an operative position.

A further object of the present invention is to provide a novel combined level indicator and hydrometer capable of measuring the liquid specific gravity over a wide range of liquid levels.

More specifically, the present invention contemplates an improved, novel combined liquid level indicator comprising an indicator member of light-transmitting material adapted to receive light in the upper exterior of a liquid container and to so reflect such light as to indicate accurately the fluctuating level of liquid in the container and in conjunction therewith a novel hydrometer means of light-transmitting material of tubular configuration having a ball captured therein with the ball being responsive to the specific gravity of the liquid of which the indicator member is associated so that the specific gravity may be read at the time of taking the reading of the liquid level.

Still more specifically, it is contemplated that the above-mentioned objects and advantages will be accomplished by the use of a unitary sheetlike or plate section of liquid transmitting material of unique geometric design.

The foregoing and other objects and advantages will be more apparent from the following detailed description when considered in connection with the accompanying drawings wherein:

FIG. 1 is a view in elevation, partly in cross section, of a combined liquid level indicator and hydrometer which is representative of one embodiment of the present invention, said device being shown in operative association with the upper wall of a liquid container, such as a storage battery;

FIG. 2 is a side elevation of FIG. 1;

FIG. 3 is a plan view of FIG. 1 at the top of the battery, illustrating the combined liquid level indicator and hydrometer in use;

FIG. 4 is a view in cross section, taken along line 4-4 of FIG. 1 looking in the direction of the arrows, illustrating the light-transmitting material providing the liquid level indicator and hydrometer means;

FIG. 5 is a view in cross section, taken along line 5-5 of FIG. 1, looking in the direction of the arrows, illustrating the vertical light-receiving and reflecting surfaces of the light-transmitting member; and FIG. 6 is a view in elevation, partly in cross section, of another embodiment of the combined liquid level indicator and hydrometer as applied to an opening of an automotive radiator with the device illustrated in inoperative position in solid lines and in dashed lines in its lowermost or operative position for indicating the liquid level and specific gravity of a coolant within the radiator.

Referring now to the drawing more in detail, wherein like numerals have been employed to designate similar parts throughout the various figures, a combined liquid level indicator and hydrometer 10, is illustrated in FIG. 1 through FIG. 4. The combined liquid level indicator and hydrometer 10 is illustrated in operative association with a liquid container 11, such as a storage battery. For the purpose of disclosing one practical application of the combined liquid level indicator and hydrometer 10, the container 11 is filled to a predetermined depth with a suitable electrolyte 12. However, the combined liquid level indicator and hydrometer 10, may be used in any container such as the upper tank of an automotive radiator 11' shown in FIG. 6 to indicate the level of the coolant and specific gravity thereof of the various types of commercial forms of antifreeze which may be utilized.

The combined liquid level indicator and hydrometer 10, is preferably formed of suitable relatively thin plate or sheetlike transmitting and light-reflective plastic material, or glass having predetermined geometric shape such as disclosed in U.S. Pat. No. 3,417,614, granted Dec. 24, 1968. The combined liquid level indicator and hydrometer 10 comprises a liquid level indicator member 13 and a hydrometer 14 for the specific gravity of the liquid such as an electrolyte or coolant. The upper edge surface 15 of the level indicator member, or light-transmitting member 13, is located in an exposed position with respect to the container or tank 11. As indicated by the arrows and dashed lines in FIG. 1, light received by the exposed surface or edge 15, is directed downwardly to an edged surface 16, which is disposed at a 45° angle with respect to the edged surface 15. These light rays are reflected horizontally as shown in the schematic pattern thereof of FIG. 1, to a vertically disposed edged surface 17, which is inclined at approximately 45° to the plane of the member 13. This surface 17 causes the light ray to be reflected at 90° to an opposite complimentary vertical edged surface 18. The surface 18 is disposed at 90° with respect to the surface 17, and light rays from the surface 18 are reflected back to the surface 16 and thence upwardly to the exposed horizontal surface 15. Thus it will be understood that if the vessel 11 contained no liquid, the entire surface 15 would be illuminated with reflected light.

It will be understood that light will only be reflected from that portion of the surfaces 16, 17, and 18 of the light-transmitting member 13 not immersed within the liquid of the container 11. In FIGS. 1, 4 and 6, the liquid level is indicated by the horizontal dot and dash line 19. Under these circumstances, the only portion of the light-receiving edge surface 15, which will be illuminated is that which is positioned to the left of the one-half mark indicated on this edge surface. The remainder of this surface, positioned to the right of the one-half mark will not be illuminated because the portion of the surfaces 16, 17 and 18 of the light-transmitting member 13, positioned immediately below this area, are immersed in the liquid. Thus, the container 11' will be illuminated, for example, at the line 19' of the coolant of the radiator of FIG. 6, and this illuminated surface will appear at the upper edge surface 15 of the liquid level indicator 13. If the container is completely filled with liquid, no portion of the light-receiving surface 15 will be illuminated.

Referring to FIGS. 1—4, the inclined edge surface 16, extending from the bottom of the vertical disposed edge surfaces 17 and 18, upwardly to the opposite vertical edge 20, is angularly undercut at 16' on the opposite planar surfaces of the light-transmitting member 13, to prevent light loss and false reading. These angular undercuts 16' are also formed at the upper edge of the inclined hydrometer 14. The undercut eliminates the possibility of a false reading by the passage of light through wall 27 of the hydrometer 14.

Referring to FIGS. 1—4 the combined liquid level indicator and hydrometer 10 is provided with a flange member 21 which may be integrally formed from the same material as the light-transmitting member 13, or separately formed complementally to the upper end of the light-transmitting member 13, and affixed in place with a suitable adhesive. The flange 21 which may be integrally molded with the combined liquid level indicator and hydrometer in position for each cell and operatively positioned when molded with the cover 22, now preferably molded from polyethylene plastic material preferably black and which is complementally formed to the opening of the usual square- or rectangular-shaped plastic shell of the battery which may also be fabricated from translucent polyethylene material, or other suitable material from which battery boxes or shells are fabricated. For example, a 6-volt battery would have three combined liquid level indicators and hydrometers integrally formed on the cover 22, to extend within the three cells of the battery and similarly a 12-volt battery would have six combined liquid level indicators and hydrometers integrally molded on the cover for the 12-volt battery. In each instance, the respective combined liquid level indicator and hydrometer for each cell of a battery has the upper edge surface 15 extending above the top surface of the battery cover to permit the liquid level and specific gravity of each cell to be readily read. Other forms of securing means for operatively mounting the combined liquid level indicator and hydrometer at each cell in the form of a seal provided by an O-ring complementally formed to a groove in the upper end of the light transmitting member and the cover 22, for the respective opening through which the combined liquid level indicator and hydrometer 10, may be operatively mounted by integrally molding or detachably mounting the O-ring providing a suitable seal.

Referring to FIGS. 1—6, a preferred form of hydrometer 14, will be described for use with the combined liquid level indicator and hydrometer of this invention. The hydrometer 14 is also preferably formed of suitable relatively thin plate or sheetlike light-transmitting and light-reflective plastic material and having a chamber means 24. The chamber means 24 is in the form of a rectangular-shaped tunnel similarly inclined at 45° as is the lower edged surface 16 of the liquid level indicator. The hydrometer means 14 is contiguously formed to the undercut angle 16'. The chamber means 24 is provided with upper and lower inclined parallel walls 25 and 26, and vertically spaced symmetrically formed parallel vertical walls 27 between which an indicating ball float means 28 having a predetermined known specific gravity is operatively mounted for indicating at least one or more specific gravity conditions within the preferred range of the specific gravity of the electrolyte of a battery or the coolant of a radiator with which the combined liquid level indicator and hydrometer is used.

Referring to FIG. 1, the chamber means 24 is preferably formed as a through opening which at its upper end may be provided with a rectangular-shaped vent 29, and the remainder thereof with a suitable closure 30 which may be separately or integrally formed. The closure 30, if separately formed, may be affixed in place by a suitable adhesive. The indicating ball float means 28 is preferably colored for ease of viewing. For example, the ball is formed of preferably red or blaze orange polyethylene material of suitable density within the range of density in which the hydrometer is being used and is of such a size as to freely rise and fall within the inclined chamber means 24, as the liquid level is changed or as the density of the electrolyte or coolant is changed. It is preferred to mount the indicating ball float means 28 through the open end 31 after which the material forming the chamber means 24 may be readily staked inwardly as at 32 to prevent the outer discharge and loss of the ball indicating means 28. It is within the scope of the invention that both the upper and lower ends of the chamber 24 may be staked to suitably vent the chamber 24, and also to permit the ready flow of the electrolyte or coolant through the chamber in the test position of the combined liquid level indicator and hydrometer.

Referring to FIGS. 1—6, the ball float means 28, of the combined liquid level indicator and hydrometer, in FIGS. 1—4 illustrating it applied to a battery, is shown at the relatively low charge of the electrolyte and with the electrolyte substantially in its half-full position. In FIG. 6 in the dotted position of the combined liquid level indicator and hydrometer applied to an automotive radiator the indicating ball float means 28 is shown in its relative high specific gravity for the coolant and in the substantially full position of the coolant within the upper radiator tank.

Referring to FIG. 6, a particular embodiment of the combined liquid level indicator and hydrometer 10' will be described for use with an automotive-type radiator wherein a radiator of this type now has a large amount of contaminant in the water which would normally act upon and discolor an indicator, and wherein the liquid level and specific gravity of the coolant may be checked on an occasional basis by a moveable liquid level indicator and hydrometer 10'. With this device also at the same time of taking a liquid level reading, it would be possible with a device of this type to also read the specific gravity. The optical arrangement of the liquid level indicator and hydrometer substantially are identical to the construction as described with reference to a combined liquid level indicator and hydrometer for use with a battery electrolyte. As the particular form of light-transmitting member and hydrometer means has been particularly described with reference to FIGS. 1—5 of the combined light-indicating and hydrometer means for testing an electrolyte of a battery, the particular manner of mounting this combined liquid level indicator and hydrometer means for testing the level of a coolant and the specific gravity thereof of a radiator will be described.

Referring to FIG. 6, the combined liquid level indicator and hydrometer 10' instead of the rectangular flange 21, of the device of FIG. 1 is provided with a flange in the form of an annular circular-shaped member 33, adapted to be complementally accepted by the inner surface of a cylindrical shaped shell 34. The circular member 33 is provided with a central rectangular opening to complementally receive the rectangular-shaped liquid level indicator 13. It is preferred that the circular member 33 shall be fabricated from suitable and may be relatively thin plate or sheetlike light-transmitting and the light-reflective plastic material, and suitably adhesively affixed to the light-transmitting member 13 or form integral therewith. Other materials such as a suitable metal and the like may be used, which may be brass, to withstand the corrosive action of the coolant within the radiator. An O-ring seal 35 is complementally formed and seated within an annular groove 36 and projects laterally therefrom to provide an effective seal for the radiator wherein the coolant normally is under pressure in the cooling systems of modern automobiles. The cylindrical-shaped shell 34 may also be fabricated from metal or a suitable plastic material to withstand the pressures of the radiator in operation, and at the bottom end, the shell is provided with an annular bayonet-type latch 37, similar to that of a radiator cap, and is complementally formed to a radiator filler opening 38, which normally is provided on the top of the usual upper radiator tank.

It is within the scope of the invention that the regular radiator cap may be replaced by the combined liquid level indicator and hydrometer construction of FIG. 6, or a radiator may be utilized which may have two filler openings, one of which in normal use is used in filling the radiator whereas the second filler opening may be used for detachably mounting the combined liquid level indicator and hydrometer which may also be left on the radiator and only removed for replacement or repair, and at that time, the usual radiator cap may be used to seal this radiator opening. The cylindrical-shaped shell 34 at its upper end may be provided with an annular member 39 which serves as a stop for the combined liquid level indicator and hydrometer 10' in its raised position, as shown in FIG. 6 out of the coolant. The member 39 may be formed from the material of the shell 34, in the fabrication thereof in any well known manner. A compression spring 40 operatively mounted within the shell 34 normally biases the combined liquid level indicator and hydrometer to its uppermost position as indicated in FIG. 6, raising it out of the coolant. By manually depressing the indicator and the ring like flange 33 against the force of spring 40 it may be positioned within the coolant as shown in the dotted position with a lower edge placed contiguous to and above the upper surface of radiator tubes 41 suitably affixed in a tube sheet 42 of the upper radiator tank, contiguous to the upper cooling fins 43. After reading the liquid level of the coolant and the specific gravity thereof, upon release of the manual depression force, the compression spring 40 returns the indicator 10 and its associated annular member 33 with ring 36 to the upper position, as shown in FIG. 6.

Referring to FIG. 3 and FIG. 6, suitable indicia may be provided upon the battery cover as illustrated in FIG. 3 to indicate the level of the electrolyte within the range from "LOW" through "FULL" and also suitable indicia may indicate "Proper Charge Range," preferably engraved on the upper edge surface 15, FIG. 3. In the device of FIG. 6 for use with radiator coolant, similar suitable indicia may be imprinted or etched on the surface of the annular circular member 33, or may be etched on or otherwise engraved or printed on the upper surface of the annular member 39. In the raised position of the device, the ball indicating means 28 returns to the bottom of the tunnel 24, whereas in the lower position, the ball 28 takes the position to indicate the specific gravity.

It will be apparent from the foregoing description that the present invention contemplates a very simple, inexpensive, yet highly efficient combined liquid level indicator and hydrometer for indicating levels of liquid subject to fluctuation and the specific gravity thereof. The unitary platelike, or sheetlike light-transmitting member may be provided along its upper, generally horizontal light-receiving edge surface means with indicia indicating the various fluctuating levels of liquid in the container, or as described with reference to the device of FIG. 3, the indicia may be located on the battery or radiator cover contiguous to the indicating member. The generally vertically edge surface means extending downwardly from one extremity of the above-mentioned horizontal edge surface, and the angularly disposed light-reflective edge surface means extending downwardly from adjacent the opposite extremity of said horizontal surface in approaching relation with respect to the lower extremity of the vertical edge, presents a triangular form which functions operatively to receive light from and to reflect light to the upper horizontal edge or surface. By having the acute corner of the generally triangularly shaped level indicator depending within the container, infinite variations in liquid levels may be indicated and readily observed along the upper horizontal edged surface of the member. The indicia shown on the upper edge surface 15 may instead be engraved on the edge surface 16, or that of the hydrometer bottom edge surface and reflected to the surface 15. There has also been disclosed a very simple, inexpensive yet highly efficient hydrometer for indicating the specific gravities such as that of a battery electrolyte or radiator coolants such as commercial forms of antifreezes and the like, now available.

Although with this device it is possible to simultaneously read the liquid level and specific gravity of the liquid with which the device is being used, one, however, may read either the liquid level or the specific gravity of the coolant or electrolyte depending upon the particular need at the time.

While a specific embodiment of the invention is disclosed herein for purposes of illustration, it will be understood that the combined liquid level indicator and hydrometer may vary in certain geometric respects without departing from the spirit and scope of the appended claims.

The invention I claim is as follows:

1. A combined liquid level indicator for indicating levels of liquid subject to fluctuations and hydrometer means indicating the specific gravity of the liquid, including a platelike light-transmitting member comprising an upper light-receiving edge surface means, a generally vertical edge surface means extending downwardly from adjacent one extremity of and normal to said upper light-receiving edge surface means and including a pair of vertical surfaces intersecting at 90°, an oppositely disposed light-reflective edge surface means extending downwardly at substantially 45° with respect to said upper edge surface means in approaching relation with respect to the lower extremity of said vertical edge surface means and adapted to extend within a body of liquid subject to level fluctuations, said light-reflective edge surface means being so angularly disposed with respect to said upper edge surface means and said vertical edge means as to receive and reflect light on only the portion thereof located above the level of the body of liquid, said hydrometer means including elongated chamber means attached to and substantially coextensive with said reflective edge of said liquid level indicator and formed from light-transmitting material similar to that of the liquid level indicator, said chamber means including a tunnel-shaped member, and indicating ball float means operatively mounted within the tunnel-shaped member which are responsive to the specific gravity of the liquid within which the combined liquid level indicator and hydrometer means is inserted, oppositely disposed symmetrically shaped grooves formed at the juncture of the inclined light-reflective edge of the platelike transmitting member of the liquid level indicator and said tunnel-shaped member of the hydrometer means for preventing light loss within the platelike transmitting member of the liquid level indicator, said ball float means adapted to move upwardly and downwardly within the angularly disposed tunnel-shaped member dependent upon the specific gravity of the liquid being tested, and the image of the ball float means being projected on the upper light-receiving edge surface means within the specific gravity range of the liquid being tested simultaneously with the visual presentation of the condition of the liquid level.

2. A combined liquid level indicator and hydrometer means as set forth in claim 1, wherein the liquid level indicator and hydrometer means are integrally formed of light-transmitting material.

3. A combined liquid level indicator and hydrometer means as set forth in claim 1, wherein vent means for said inclined tunnel-shaped member is provided at the upper end thereof to vent the tunnel-shaped member, and closure means formed at the lower end of the tunnel-shaped member to limit the lower range of movement of said indicating ball float means and permit liquid being tested for its specific gravity to enter the tunnel-shaped member.

4. A combined liquid level indicator and hydrometer means as set forth in claim 1, wherein flange means is formed on the upper end of the light-transmitting member for operatively mounting the liquid level indicator and hydrometer means on a closure for a liquid container for the liquid to be tested.

5. A combined liquid level indicator and hydrometer means as set forth in claim 1, wherein said liquid level indicator and hydrometer means is operatively mounted within a housing operatively mounted on a container for the liquid being tested, flange means extending laterally from said indicator and formed complemental to the housing interior, stop means on the housing for limiting the upper and lower position of the liquid level indicator and hydrometer means said flange means including sealing means for sealing the flange means and housing, spring means operatively mounting the liquid level indicator and hydrometer means for relative movement within the housing whereby upon pushing down on the flange means, the liquid level indicator and hydrometer means may be positioned within the liquid level tested to read the level of the liquid and the specific gravity thereof, and upon release of the flange means, the liquid level indicator and hydrometer means is returned to its normal position out of contact with the liquid.

6. A combined liquid level indicator and hydrometer means as set forth in claim 1, wherein said liquid level indicator and hydrometer means is operatively mounted within a housing operatively mounted on a closure opening of an upper tank of an automotive radiator for the coolant being tested and including tubes for the coolant, flange means complementally formed to the housing, stop means on the housing for limiting the upper and lower position of the liquid level indicator and hydrometer means, said flange means comprising annular sealing means for sealing the flange means and housing, spring means operatively mounting the liquid level indicator and hydrometer means within the housing, whereby upon pushing down on the flange means, the liquid level indicator and hydrometer means may be positioned within the coolant being tested contiguous to the upper ends of the coolant tubes of the radiator to read the level of the coolant and the specific gravity thereof, and upon release of the flange means, the liquid level indicator and hydrometer means is returned to its normal position out of contact with the coolant.

7. A combined liquid level indicator and hydrometer means as set forth in claim 1, wherein said liquid level indicator and hydrometer means is mounted within a housing operatively mounted on a closure opening of an upper tank of an automotive radiator containing the coolant being tested, said lower end of the housing being complemental to the closure opening of the upper tank permitting the liquid level indicator and hydrometer means to be detachably mounted on the closure opening, flange means affixed to the liquid level indicator at the upper end thereof and adapted to be complementally accepted by the housing, stop means on the housing for limiting the upper and lower position of the liquid level indicator and hydrometer means, said flange including sealing means for sealing the flange means and housing, spring means operatively mounting the liquid level indicator and hydrometer means within the housing, whereby upon pushing down on the flange means the liquid level indicator and hydrometer means may be positioned within the coolant being tested to read the level of the coolant and the specific gravity thereof, and said spring means upon release of the flange means returns the liquid level indicator and hydrometer means to its normal position out of contact with the coolant.